(12) United States Patent
Olesen et al.

(10) Patent No.: US 7,732,720 B2
(45) Date of Patent: **\*Jun. 8, 2010**

(54) DRAFT PROTECTION DEVICE FOR A BALANCE AND HAVING A FRICTION REDUCTION DEVICE

(75) Inventors: Neil Olesen, Millington, NJ (US); Felix Holken, Morristown, NJ (US); Sammy Lee, Kunshan (CN)

(73) Assignee: Ohaus Corporation USA, Pine Brook, NJ (US)

( \* ) Notice: Subject to any disclaimer, the term of this patent is extended or adjusted under 35 U.S.C. 154(b) by 212 days.

This patent is subject to a terminal disclaimer.

(21) Appl. No.: 11/525,442

(22) Filed: Sep. 22, 2006

(65) Prior Publication Data

US 2007/0012488 A1  Jan. 18, 2007

Related U.S. Application Data

(63) Continuation-in-part of application No. 11/357,755, filed on Feb. 17, 2006.

(60) Provisional application No. 60/654,568, filed on Feb. 18, 2005.

(51) Int. Cl.
*G01G 21/28* (2006.01)

(52) U.S. Cl. .................................................. 177/180
(58) Field of Classification Search .......... 177/180–182
See application file for complete search history.

(56) References Cited

U.S. PATENT DOCUMENTS

| 4,664,207 | A  | * | 5/1987 | Knothe et al. ............... 177/181 |
| 5,874,694 | A  | * | 2/1999 | Ruedisueli .................. 177/180 |
| 6,504,112 | B1 | * | 1/2003 | Luebke et al. ............... 177/180 |
| 6,566,614 | B1 | * | 5/2003 | Fluckiger et al. ............ 177/180 |
| 6,686,545 | B2 | * | 2/2004 | Luchinger et al. ........... 177/180 |
| 6,844,507 | B2 | * | 1/2005 | Leisinger et al. ............ 177/180 |
| 6,849,809 | B2 | * | 2/2005 | Luchinger et al. ........... 177/180 |

\* cited by examiner

*Primary Examiner*—Randy W Gibson
(74) *Attorney, Agent, or Firm*—Standley Law Group LLP

(57) ABSTRACT

A draft protection device for a balance and a balance equipped with the draft protection device, wherein the draft protection device includes front and rear panels, two side panels and a top panel, and four posts which are fixedly mounted on a top cover of the balance, and wherein the posts extend vertically. The front and rear panels rest against the posts and are held in place by grooves provided in front and rear top frames which are connected to the top ends of the posts. The side panels are slidable while the front and rear panels are stationary. A friction reduction device mounted in the scale top cover so that the side panels slide along the friction reduction device.

20 Claims, 5 Drawing Sheets

DRAFT PROTECTION DEVICE FOR A BALANCE AND HAVING A FRICTION REDUCTION DEVICE

CROSS-REFERENCE TO RELATED APPLICATION

The present application is a continuation-in-part of U.S. patent application Ser. No. 11/357,755, filed Feb. 17, 2006, which claims priority of provisional U.S. Application Ser. No. 60/654,568 filed Feb. 18, 2005.

BACKGROUND OF THE INVENTION

1. Field of the Invention

The present invention relates to a friction reduction device for a draft protection device for a balance and to a balance equipped with the friction reduction device for the draft protection device.

2. Description of the Related Art

Draft protection devices for balances are known in the art.

U.S. Pat. No. 5,874,694 discloses a draft shield design. The draft shield is mounted on a top cover of the balance and includes front and rear panels as well as two side panels forming a main chamber, wherein the side panels and a top panel are slidable. However, the panels are not removable without the use of a tool and, therefore, it is not easy to clean the draft shield. The top panel slides on the inside on side rails, so that it is not possible to place an object which is taller and wider than the draft shield into the main chamber of the balance.

In existing draft shield designs, structural stiffness is provided through a rugged back panel or a full frame structure of the slidable top panel.

Furthermore, friction can affect the smooth operation of the sliding panels.

SUMMARY OF THE INVENTION

It is the primary object of the present invention to provide a draft protection device for a balance with slidable side panels and a flip top panel without a top frame being mounted between the sliding panels and the top panel.

Another object of the present invention is to provide the user of the balance with easy access to cleaning all parts of the draft shield.

Still another object is to provide a friction reduction device that improves the operation of the slidable side panels. This should not interfere with the ability to easily remove the side panels or require the need for special tools.

In accordance with the present invention, the draft protection device is comprised of four posts which are fixedly mounted in the corners of the top cover of the balance, wherein the posts extend vertically. The front and rear panels rest against the rods and are held in place by a groove provided in the top cover of the balance and in top frames mounted in the posts.

In accordance with the configuration according to the present invention, a frameless design of the draft protection devise allows the user to place an object onto the weighing dish that is taller and wider than the overall height and width of the balance, while still having the advantage of a front and rear protection against any draft influences.

The configuration according to the present invention also makes it possible to provide easy access to all structural components of the draft shield in order to make it possible to clean whole parts of the draft shield. This is made possible by the removable side, front, and back panels as well as the flip top panel.

A friction reduction device is mounted in the scale top cover so that the side panels easily slide along the friction reduction device.

The various features of novelty which characterize the invention are pointed out with particularity in the claims annexed to and forming a part of the disclosure. For a better understanding of the invention, its operating advantages, and specific objects attained by its use, reference should be had to the drawing figures and written description in which there are illustrated and described preferred embodiments of the invention.

DETAILED DESCRIPTION OF THE INVENTION

Figure 1:
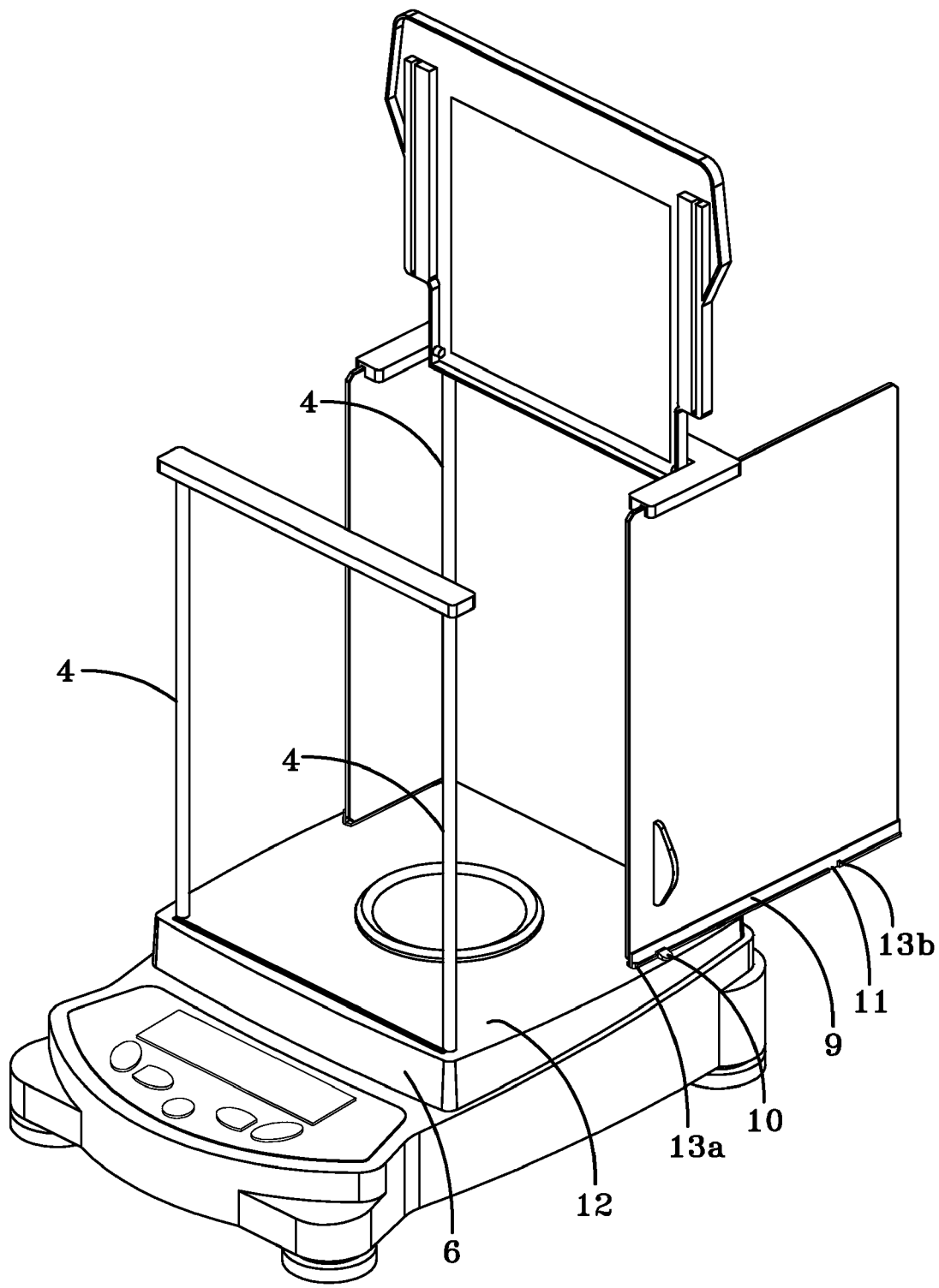
FIG. 1 is a perspective front view of the balance with draft protection device according to the present invention.
Figure 2:
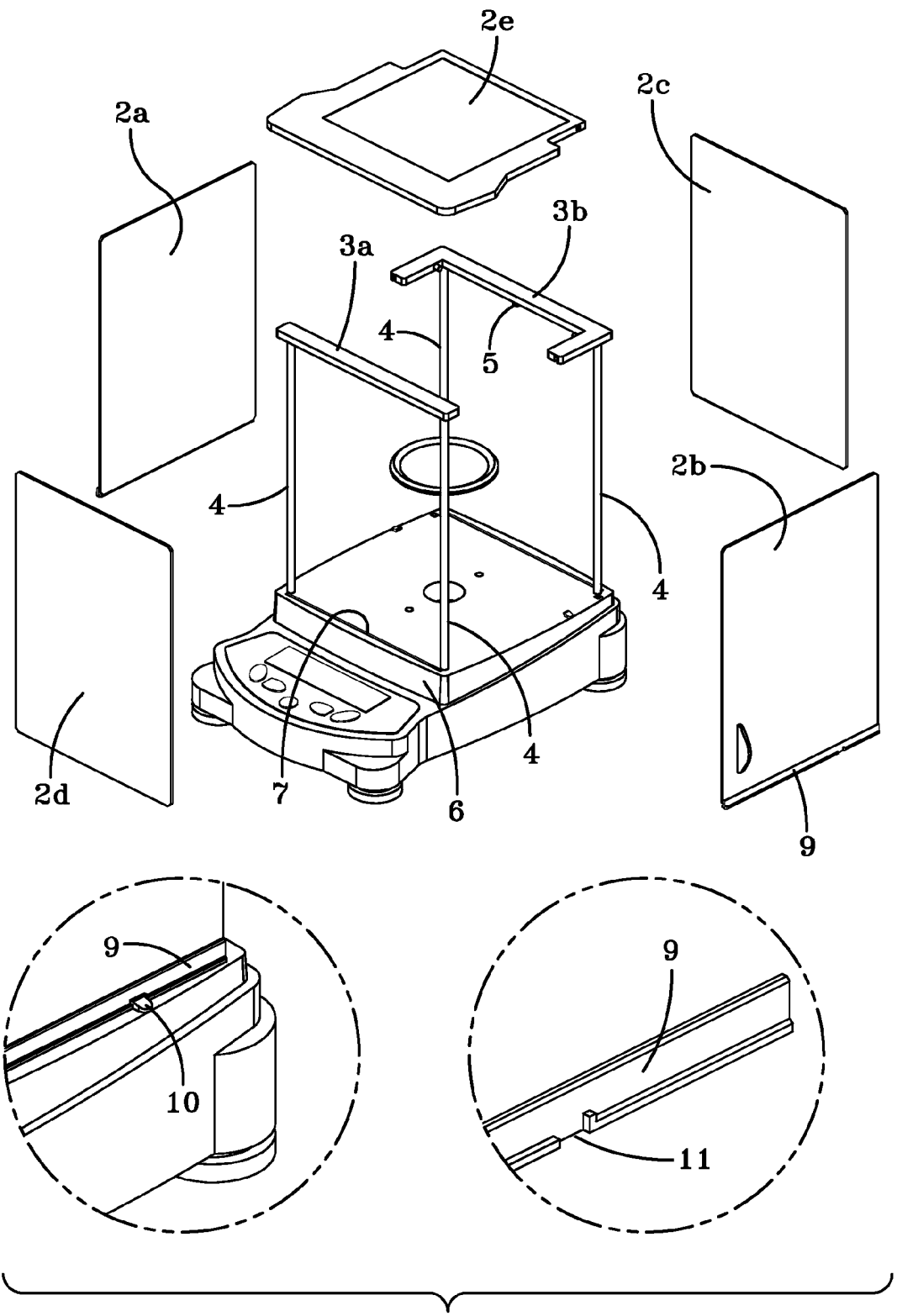
FIG. 2 is an exploded view of the draft protection device and balance of FIG. 1, with the gliders of the side panels and the glider block thereof being shown on a larger scale.
Figure 3:
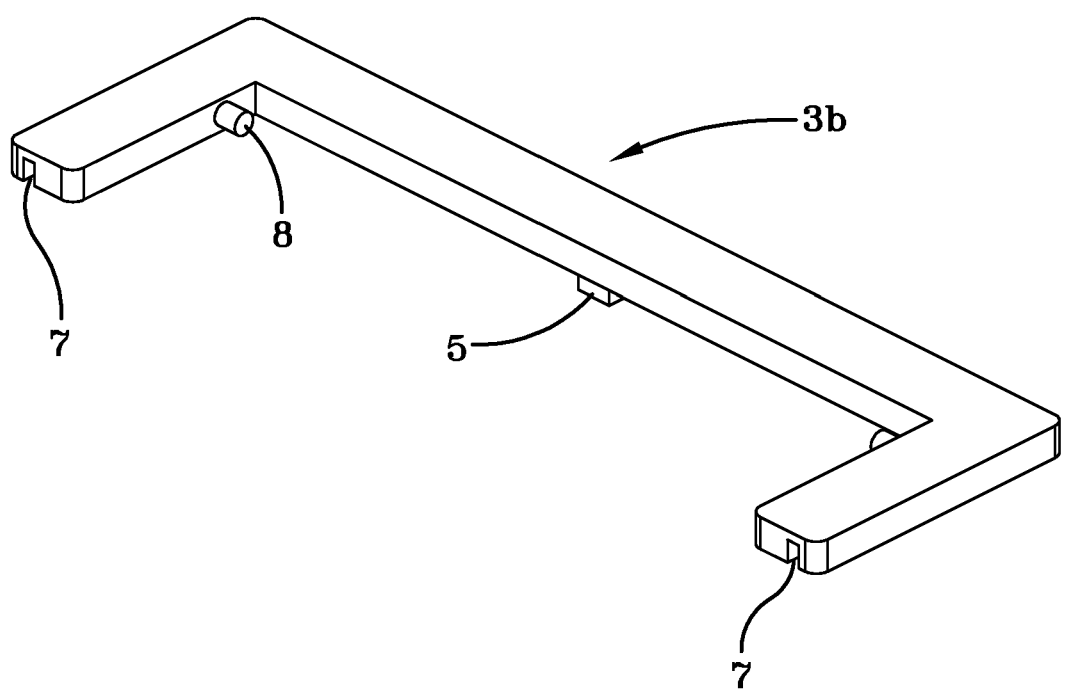
FIG. 3 is a perspective view showing a rear top frame of the draft protection device.

As illustrated in FIGS. 1-3, a balance includes a top cover 6 comprised of a sheet metal plate 12 and a weighing dish.

The draft protection device is comprised of vertically extending rods 4 that support the front panel 2d and the rear panel 2c, which panels are not slidable. Side panels 2a and 2b are provided so as to be slidable in a groove 7 in the top frame 3b.

The rods 4 provide the main structural support of the draft protection device which is composed of the panels.

The rods 4 may be of stainless steel or carbon filled plastic material.

As seen in FIG. 2, the front panel 2d is held in place by a front frame member 3a extending across the upper ends of the rods 4 and the rear panel 2c is held in place by a rear top frame 3b which is provided with a clip 5 engaging the panel 2c and by a groove in the scale top cover 6.

In the installed position of the front and rear panels 2d and 2c, the front and rear panels press against the rods 4. This acts as a seal against outside draft disturbances.

The side panels are held in place through grooves 7 in the front and rear top frames 3a and 3b, and by a glider 9, a glider block 10, and a sheet metal plate 12. The sheet metal plate forms the scale top cover 6. The glider 9 is mounted on the side panels 2a and 2b. The glider block 10 is mounted on the scale top cover 6. In the installed position, the two side panels can be moved between front and rear positions. The glider 9 has front and back limit stops 13a and 13b for controlling the travel range of the side panels. When in the closed position, the two side panels are pressed against the rods 4. This also acts as a seal against outside draft disturbances.

In order to be able to remove a side panel, the side panel must be in the closed position thereof. The glider 9 has a notch 11 which allows the side panel while in the closed position to be lifted upwardly into the groove 7 of the respective top frame 3a, 3b and be lifted over the glider block 10.

The top panel 2e is a flip top panel which is connected to the rear top frame 3b at hinge points 8 which are shown in FIG. 3.

When in the open position, the flip top panel can be removed by lifting it out of the hinges 8.

Accordingly, the draft protection device can be disassembled by first upwardly moving the flip top panel 2e out of the hinges 8. Then the side panels can be removed by lifting the side panels so as to engage deeper into the grooves 7 of the respective top frame 3a or 3b. This allows the glider 9 to be moved through the notch 11 and to lift the side panel over the glider block 10.

Then the front and rear panels can be removed by actuating the clips 5 and releasing the respective front and rear panels.

Figure 4:
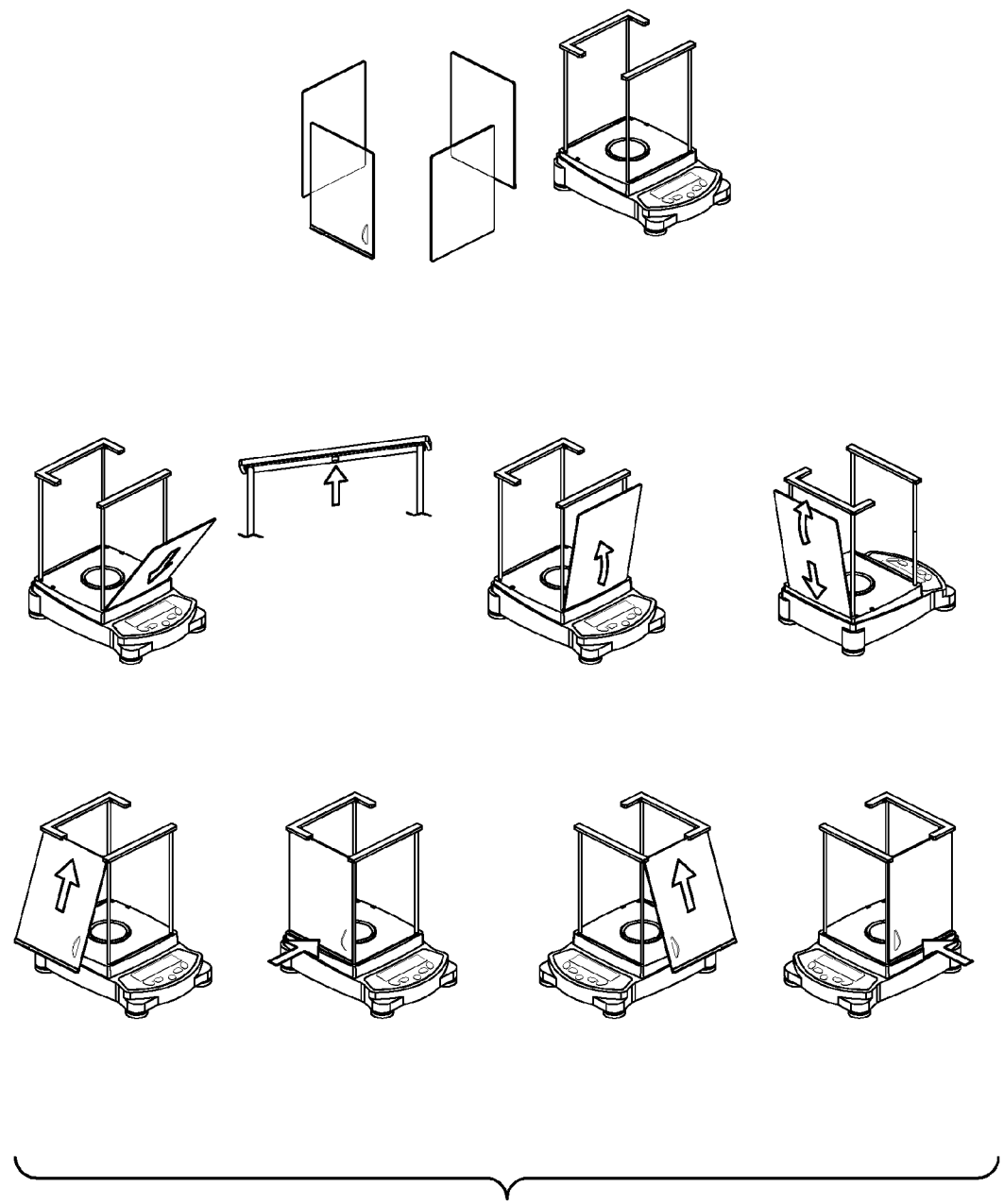
FIG. 4 is a diagram showing the assembly of the draft protection device.

The sequence of assembling the draft protection device is schematically illustrated in FIG. 4 of the drawing figures.

Figure 5:
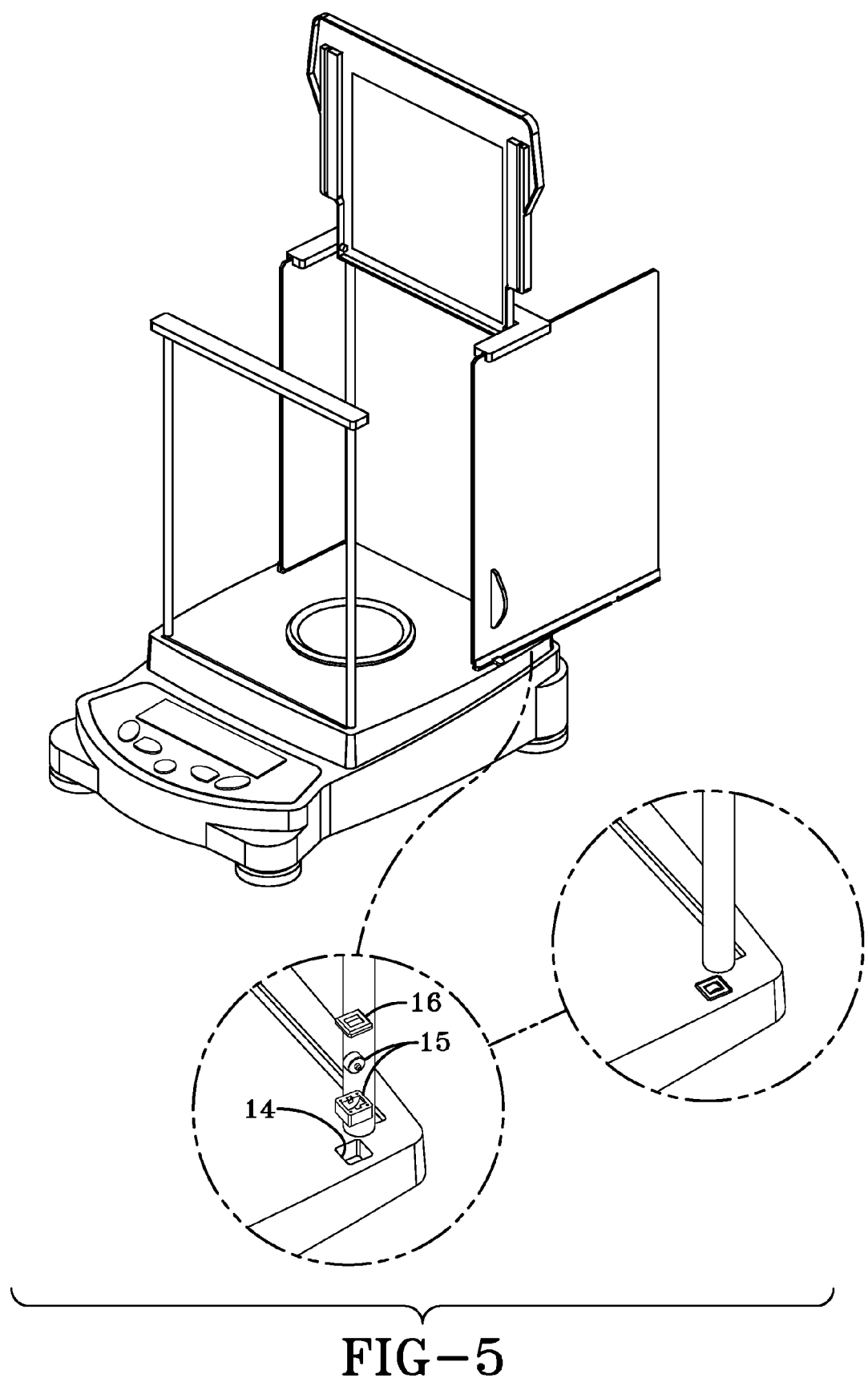
FIG. 5 is a view as in FIG. 1 showing the friction reduction device.

As shown in FIG. 5, the friction reduction device is mounted near the rear of the top cover 6 to insure smooth operation of the sliding side panels. The friction reduction device 14, 15, 16 supports the weight of the door as the door panel is moved to the rear. By reducing friction the side panels require less force to move throughout its path of travel.

The top cover 6 has a cut-out 14 into which an anti-friction device 15 is inserted. The anti-friction device 15 can be a fixed wear pad made of a low friction material or a roller made of a suitable material, such as plastic or metal. The roller can include a cover 16 to prevent dirt from collecting around the roller. Although the friction reduction device illustrated in the drawing includes a roller, in certain instances the use of a wear pad may be advantageous since no moving parts are needed.

By providing either the roller or the wear pad the side panels can easily slide without the need of much force.

While specific embodiments of the invention have been shown and described in detail to illustrate the inventive principles, it will be understood that the invention may be embodied otherwise without departing from such principles.

We claim:

1. A draft protection device for a balance having a scale top cover, vertically extending rods attached to corners of the scale top cover, and a weighing dish, the draft protection device comprising stationary front and rear panels, slidable side panels, and a flip top panel, front and rear top frames extending across top ends of the rods, wherein the front and rear panels engage in grooves of the scale top cover and of the front and top frames, wherein, in the assembled state, the front and rear panels are in contact with the rods, the side panels being slidable in grooves of the front and rear top frames and on the scale top cover, wherein the side panels have means for controlling the travel range of the side panels on the scale top cover, and wherein the flip top panel is connected to the rear top frame so as to be pivotable, and further comprising a friction reduction device mounted in the scale top cover so that the side panels slide along the friction reduction device.

2. The draft protection device according to claim 1, wherein the friction reduction device includes a roller arranged in a cut-out in the scale top cover, the side panel engaging the roller so as to be slidable thereon.

3. The draft protection device according to claim 2, further including a cover mounted in the cut-out so as to surround the roller and prevent dirt from collecting around the roller.

4. The draft protection device according to claim 1, wherein the friction reduction device includes a wear pad mounted in the scale top cover.

5. The draft protection device according to claim 4, wherein the wear pad is made of a low friction material.

6. The draft protection device according to claim 1, wherein the front and rear panels are releasably connected to the front and rear top frames by a clip.

7. The draft protection device according to claim 1, wherein the rods are of stainless steel or carbon filled plastic material.

8. The draft protection device according to claim 1, wherein the means for controlling the travel range of the side panels is comprised of back limit stops attached to gliders at bottom edges of the side panels.

9. The draft protection device according to claim 1, wherein the side panels have notches in the gliders for allowing the side panels to be lifted over associated glider blocks when in the closed position.

10. The draft protection device according to claim 1, wherein the
flip top panel is attached to the rear top frame by hinges attached to the rear top frame.

11. A balance in combination with a draft protection device, the
balance having a scale top cover, a weighing dish and vertically extending rods attached to corners of the scale top cover, wherein the draft protection device comprises stationary front and rear panels, slidable side panels, and a flip top panel, front and rear top frames extending across top ends of the rods, wherein the front and rear panels engage in grooves of the scale top cover and of the front and top frames, wherein, in the assembled state, the front and rear panels are in contact with the rods, the side panels being slidable in grooves of the front and rear top frames and on the scale top cover, wherein the side panels have means for controlling the travel range of the side panels on the scale top cover, and wherein the flip top panel is connected to the rear top frame so as to be pivotable, and further comprising a friction reduction device mounted in the scale top cover so that the side panels slide along the friction reduction device.

12. The combination balance/draft protection device according to claim 11, wherein the friction reduction device includes a roller arranged in a cut-out in the scale top cover, the side panel engaging the roller so as to be slidable thereon.

13. The combination balance/draft protection device according to claim 12, further including a cover mounted in the cut-out so as to surround the roller and prevent dirt from collecting around the roller.

14. The combination balance/draft protection device according to claim 11, wherein the friction reduction device includes a wear pad mounted in the scale top cover.

15. The combination balance/draft protection device according to claim 14, wherein the wear pad is made of a low friction material.

16. The combination balance/draft protection device according to claim 11, wherein the front and rear panels are releasably connected to the front and rear top frames by a clip.

17. The combination balance/draft protection device according to claim 11, wherein the rods are of metal, stainless steel or carbon filled plastic material.

18. The combination balance/draft protection device according to claim 11, wherein the means for controlling the travel range of the side panels is comprised of back limit stops attached to gliders at bottom edges of the side panels.

19. The combination balance/draft protection device according to claim 11, wherein the side panels have notches in the gliders for allowing the side panels to be lifted when in the closed position.

20. The combination balance/draft protection device according to claim 11, wherein the flip top panel is attached to the rear top frame by hinges attached to the rear top frame.

\* \* \* \* \*